Figure 1:
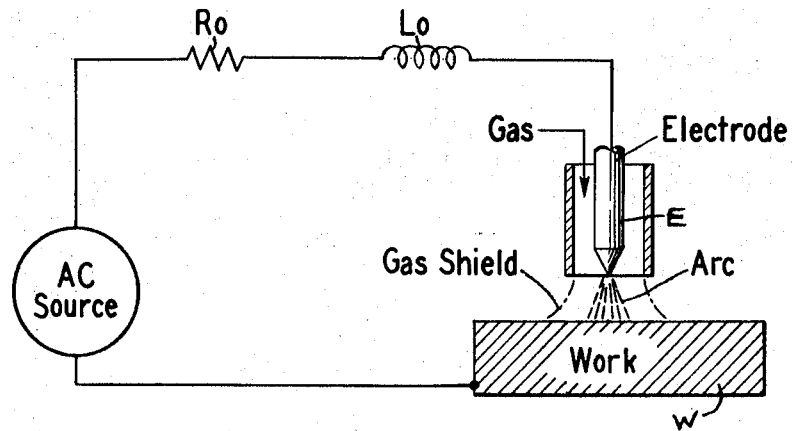

United States Patent [11] 3,586,817

[72] Inventor August Frederick Manz
  Union, N.J.
[21] Appl. No. 1,730
[22] Filed Jan. 9, 1970
[45] Patented June 22, 1971
[73] Assignee Union Carbide Corporation
  New York, N.Y.

[54] METHOD AND APPARATUS FOR STABILIZING AN AC ARC
  10 Claims, 3 Drawing Figs.
[52] U.S. Cl. ................................................ 219/131,
  219/137, 315/244
[51] Int. Cl. .................................................. B23k 9/10
[50] Field of Search .......................................... 219/131;
  315/166, 205, 239, 244; 323/94

[56] References Cited
UNITED STATES PATENTS
1,922,984  8/1933  Soundy ....................... 315/244 X
2,085,242  6/1937  Weaver ....................... 315/277
2,097,327  10/1937  Hunter ....................... 315/239
2,301,891  11/1942  Lecorguillier ............... 315/244 X
2,472,323  6/1949  Welch, Jr. .................... 315/239 X
3,117,215  1/1964  Ramsey ....................... 219/131 X
3,189,724  6/1965  Ulli ........................... 219/131

Primary Examiner—J. V. Truhe
Assistant Examiner—George A. Montanye
Attorneys—Paul A. Rose, Thomas I. O'Brien, Dominic J. Terminello and Eugene Lieberstein ABSTRACT: An inductor and capacitor first electrical equivalent circuit is connected in series circuit relationship with an AC source of potential and the electrode and workpiece for establishing a supplementary restriking potential to maintain a self-supporting AC arc while a second electrical equivalent circuit is connected in parallel with the first equivalent circuit to permit DC current to flow through the arc circuit.

PATENTED JUN22 1971 3,586,817

PRIOR ART

INVENTOR
AUGUST F. MANZ
BY
ATTORNEY

METHOD AND APPARATUS FOR STABILIZING AN AC ARC

This invention relates to AC arc working and more particularly to a method and apparatus for stabilizing and maintaining an AC arc between an electrode and workpiece.

Alternating current arcs have been characterized as having two inherent undesirable features; namely, that of arc instability or lack of arc continuity and that of arc unbalance. Arc instability is due to the tendency of the arc to extinguish at the end of each half cycle of current flow while arc unbalance is caused by the difference in arc impedance between the straight and reverse polarity half cycles. Arc unbalance results in a naturally occurring DC component of arc current which has heretofore been considered detrimental to AC arc stabilization. It was discovered in accordance with the present invention that an alternative current arc may be stabilized without reducing or eliminating from the welding circuit the naturally occurring DC component of arc current and without significantly effecting the AC component of arc current.

It is therefore the principle object of the present invention to provide a method and apparatus for stabilizing an AC arc which will permit the naturally occurring DC component of arc current to pass without significantly affecting the AC component of arc current.

It is a further object of the present invention to provide an AC power supply which is reliable, inexpensive and which will automatically insure arc reignition at instances of arc extinction irrespective of the AC arc working application to which the power supply is to be applied.

Figure 2:
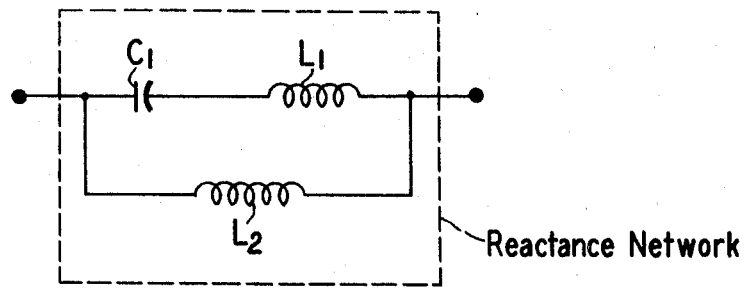
Figure 3:
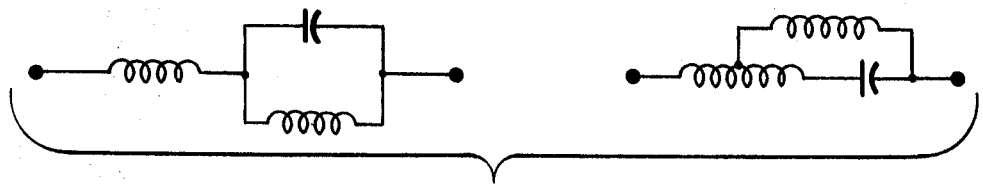

These and other objects and advantages of this invention will become apparent from the following description and from the accompanying drawings of which:

FIG. 1 shows a simplified prior art AC power supply arc welding system;

FIG 2. is an electric schematic diagram of the passive reactance circuit network of the present invention;

FIG. 3 shows a number of alternative arrangements for the passive reactance network of FIG. 2, all of which are functionally equivalent.

FIG. 1 depicts a typical prior art tungsten inert gas AC arc welding setup. Electrode E and workpiece W are connected in series circuit relationship with a conventional AC power supply which comprises in its simplest form an adjustable transformer connected to a conventional AC line source and a variable inductor. The variable inductor labeled $L_o$ in FIG. 1 provides current control. The transformer is shown represented by an AC source having an internal resistance $R_o$. An arc is established in a conventional manner between the electrode E and the workpiece W. As the arc current alternates in response to the impressed alternating voltage, the arc will tend to extinguish at instances of zero current. This tendency results in an erratic and unstable arc. Should the arc go out it can be reestablished by impressing a voltage across the gap between the electrode E and the work W of suitable magnitude to reionize a conductive path. The magnitude of voltage necessary to reestablish conduction depends upon the working environment at the gap, i.e., whether a gaseous atmosphere or flux is used as the shielding medium, the type of electrode involved (consumable or nonconsumable), the constituency of the electrode and the workpiece, the gap length, etc. Assuming the open circuit voltage of the AC source to be insufficient in itself to provide the necessary arc reignition voltage, which is generally the case since safety standards require a low open circuit voltage, auxiliary means must be employed.

It was theorized that a reactance network which consists of a series connected inductor and capacitor in parallel with another inductor would provide a sufficient potential to cause reignition of the arc as well as permit the naturally occurring DC component of arc current to pass. Experimentation has proven that such a network performs substantially in accordance with the theoretical expectations.

The preferred reactance network is shown in FIG. 2 and as stated hereinabove comprises a capacitor $C_1$ in series with an inductor $L_1$, the combination being in parallel with a second inductor $L_2$. The reactance network is preferred to hereinafter as a passive reactance network in keeping with the generally accepted terminology in the electrical arts where no active components or energy sources are included. The network when incorporated in series with the AC source shown in FIG. 1 has been demonstrated to exhibit little or no effect on the AC component of arc current while passing unaltered substantially all of the DC component of arc current through the arc circuit. Capacitor $C_1$ and inductor $L_1$, when properly selected, establish the necessary supplementary restriking potential to maintain a self-supporting AC arc. It is preferable that $L_1$ and $C_1$ be tuned to resonance at the AC source frequency in order to minimize their affect on the current during steady state operation.

At resonance the voltage vectors of $L_1$ and $C_1$ are equal and opposite. The restriking voltage vector present across the arc gap after the instant the arc is extinguished will be the vector sum of the source voltage and the voltage across condenser $C_1$. Theoretically, the magnitude of the restriking voltage vector may be varied to any predetermined level for a specific arc current by the appropriate selection of $L_1$ and $C_1$.

It is not essential to the present invention that $XL_1=XC_1$; where $XL_1$ is the inductive reactance of $L_1$ and $XC_1$ is the capacitive reactance of $C_1$. However, as one moves away from a state of resonance the phase angle between the restriking voltage vector and the arc current changes thereby lowering the absolute magnitude of the restriking potential.

The parallel connected inductor $L_2$ shown in FIG. 2 permits the passage of the naturally occurring DC component of arc current which would otherwise be blocked by capacitor $C_1$. As a design criterion the inductor $L_2$ should be selected with as low a DC resistance as possible and an inductive reactance or impedance much larger than the combined impedance of $C_1$ and $L_1$ such that the proportion of AC current that flows through $L_2$ will be small in comparison to that flowing through $C_1$ and $L_1$. In this manner $C_1$ and $L_1$ operate to pass the AC component of arc current and block the DC component while $L_2$ operates to pass the naturally occurring direct current and block the AC component. The combined effect of the network results in a highly stable AC arc with otherwise little or no effect on the circuit operation of FIG. 1.

As is well known to those familiar with network theory, the characteristics of any known reactance network may be reproduced by physically rearranging the elements in the network and by appropriately varying their magnitudes. FIG. 3 shows two physically dissimilar networks which are the functional equivalent of the preferred network of FIG. 2. In order to achieve functional equivalence the magnitude of each of the elements will vary with the arrangement chosen. Therefore, irrespective of how the circuit is physically arranged the invention is intended to embrace any passive reactance network consisting of a series connected inductor and capacitor first equivalent circuit for establishing a supplementary restriking potential and a second equivalent circuit, consisting essentially of an inductor connecting in parallel with said first equivalent circuit, for permitting the naturally occurring DC component of arc current to pass.

What I claim is:

1. Apparatus for stabilizing and maintaining an AC arc between an electrode and a workpiece comprising:
   a source of AC potential connected in series circuit relationship with the electrode, workpiece and a passive reactance network, said reactance network comprising;
   means for developing a supplementary arc restriking potential having a magnitude independent of the source voltage and which passes the AC component of arc current while blocking the DC component of arc current; and means for simultaneously passing the naturally occurring DC component of arc current, while substantially blocking the AC component of arc current.

2. Apparatus as defined in claim 1 wherein said passive reactance network consists essentially of a series connected inductor and capacitor first equivalent circuit for establishing said restriking potential and a second equivalent circuit consisting essentially of an inductor connected in parallel with said first equivalent circuit for permitting said DC component of arc current to pass.

3. Apparatus as defined in claim 2 wherein the series connected inductor and capacitor are tuned to resonate at a frequency substantially equal to the frequency of the source of AC potential.

4. Apparatus as defined in claim 2 wherein said parallel connected inductor has an inductive reactance, the magnitude of which is sufficient to substantially block the AC component of arc current.

5. Apparatus as defined in claim 1 wherein said source of AC potential comprises a transformer being connected to a conventional source of alternating current.

6. Apparatus as defined in claim 5 wherein said transformer is adjustable.

7. Apparatus as defined in claim 5 wherein said electrode is a nonconsumable electrode.

8. Apparatus as defined in claim 5 wherein said electrode is a consumable electrode.

9. In an arc welding system having a power supply connected between an electrode and workpiece, the improvement comprising; said power supply comprising a source of AC energizing potential connected to a passive reactance network which consists essentially of a series connected inductor and capacitor first equivalent circuit and a second equivalent circuit connected in parallel with said first equivalent circuit and consisting essentially of an inductor to permit the naturally occurring DC component of arc current to pass without significantly affecting the AC component of arc current.

10. A method of stabilizing and maintaining an AC arc between an electrode and a workpiece comprising the steps of introducing an inductor and capacitor in series circuit relationship with the arc circuit, the magnitudes thereof being selected such that the voltage developed across said capacitor will insure arc reignition at instances of arc extinction; and introducing reactive means to permit the naturally occurring DC component of arc current to pass through the arc circuit without significantly affecting the AC component of arc current.